United States Patent [19]

Severson et al.

[11] Patent Number: 5,394,068
[45] Date of Patent: Feb. 28, 1995

[54] AUTOMATIC INITIALIZATION IN A MODEL RAILROAD MOTOR CONTROL SYSTEM

[76] Inventors: Frederick E. Severson, 945 SW. Perfecta Ave., Beaverton, Oreg. 97005; Patrick A. Quinn, 20195 SW. Imperial Dr., Aloha, Oreg. 9700

[21] Appl. No.: 12,364

[22] Filed: Feb. 2, 1993

Related U.S. Application Data

[60] Division of Ser. No. 480,078, Feb. 14, 1990, Pat. No. 5,184,048, which is a division of Ser. No. 37,721, Apr. 13, 1987, Pat. No. 4,914,431, which is a continuation-in-part of Ser. No. 672,397, Nov. 16, 1984, abandoned.

[51] Int. Cl.$^6$ .............................................. H02P 3/00
[52] U.S. Cl. ..................................... 318/280; 318/256
[58] Field of Search .................................. 318/616-618, 318/280-286, 581, 651, 696, 685, 256, 823, 776-777, 587; 340/825.16, 825.06, 825.12, 825.57, 825.61; 441/410, 404, 269, 276, 431, 443, 407

[56] References Cited

U.S. PATENT DOCUMENTS

| 3,994,237 | 11/1976 | Thomsen | 388/806 X |
| 4,431,982 | 7/1982 | Lahti et al. | 318/51 |
| 4,611,775 | 9/1986 | Petit | 246/28 |
| 4,777,420 | 10/1988 | Dadpey et al. | 318/758 |

*Primary Examiner*—Jonathan Wysocki
*Attorney, Agent, or Firm*—Marger, Johnson, McCollom & Stolowitz

[57] ABSTRACT

Electronic control circuits for model railroading including a reversing motor control circuit. An on-board electronic state machine indicates one at a time of a predetermined series of states including forward, neutral and reverse, and is clocked to the next state responsive to an interrupt in the track power signal. The circuit further includes reset means for resetting the state machine directly to a neutral state responsive to an interruption of the track power signal of extended duration. The state machine can be remotely programmed to reset to any desired one of the series of states in response to a track power signal interrupt. The unique reset state is useful for receiving various remote control signals without driving the motor.

20 Claims, 9 Drawing Sheets

FIG. 2A
| * | Q1 | Q2 | STATE |
|---|---|---|---|
| 1 | 1 | 1 | FORWARD |
| 2 | 0 | 1 | NEUT. B. REVERSE |
| 3 | 0 | 0 | REVERSE |
| 4 | 1 | 0 | NEUT. B. FORWARD |
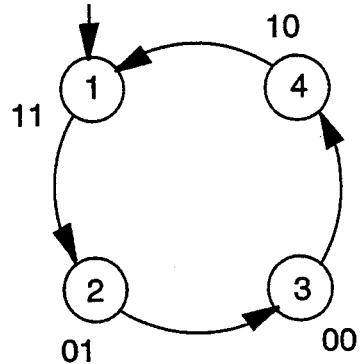
FIG. 2B
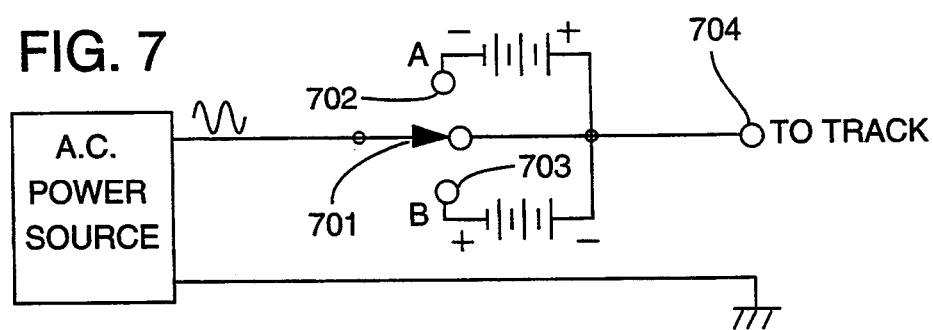
FIG. 7
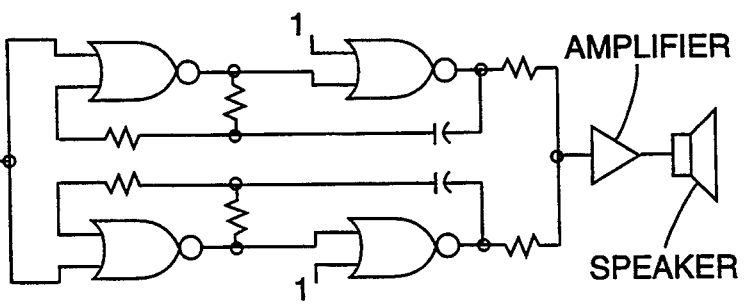
FIG. 10
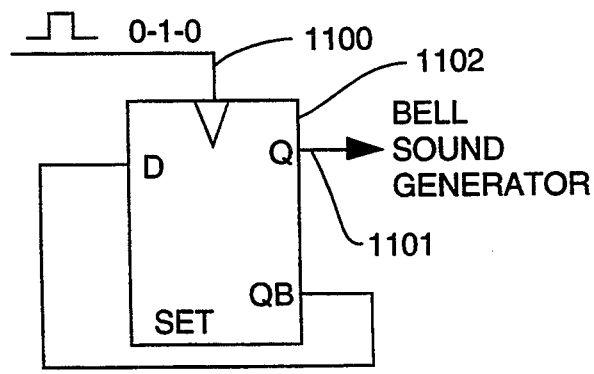
FIG. 11

FIG. 8

| DIESEL REMOTE CONTROL OPTIONS | | | |
|---|---|---|---|
| State | +dc | -dc | Remote feature |
| Reset | 0<br>0-1 ⌐<br>0-1<br>0 | 0<br>0<br>0<br>0-1-0 ⌐ | No designated option.<br>Sound of diesel turning over trying to start.<br>Diesel engine starts and RPM and volume responds to track voltage.<br>Engine toggles between master and slave status. |
| Forward | 0<br>0-1 ⌐<br>0 | 0<br>0<br>0-1-0 ⌐ | Reverse light goes off.<br>Horn blows.*<br>Bell toggles between on and off.* |
| Neutral before reverse | 0<br>0-1-0 ⌐⌐<br>0 | 0<br>0<br>0-1-0 ⌐ | Engine sound stays at idle independent of track voltage.+<br>Overhead blinking light toggles between on and off.*<br>Forward automatic coupler opens.* |
| Reverse | 0<br>0-1 ⌐<br>0 | 0<br>0<br>0-1-0 ⌐ | Reverse light goes on after one second.<br>Horns blows.*<br>Mars light toggles between on and off.* |
| Neutral before forward | 0<br>0-1 ⌐<br>0 | 0<br>0<br>0-1-0 ⌐ | No designated option.<br>Horn blows.*<br>Reverse automatic coupler opens. |

FIG. 9

| STEAM LOCOMOTIVE REMOTE CONTROL OPTIONS | | | |
|---|---|---|---|
| State | +dc | -dc | Remote feature |
| Reset | 0<br>0-1 ⌐<br>0 | 0<br>0<br>0-1-0 ⌐ | No designated option.<br>Steam start up (smoke from smoke stack and fire effect in fire box).<br>Radius rod moves to neutral.<br>Engine toggles between master and slave status. |
| Forward | 0<br>0-1 ⌐<br>0 | 0<br>0<br>0-1-0 ⌐ | Reverse light goes off.<br>Whistle blows.*<br>Bell toggles between on and off.* |
| Neutral before reverse | 0<br>0-1 ⌐<br>0 | 0<br>0<br>0-1-0 ⌐ | No steam sounds.<br>No designated option.<br>Forward automatic coupler opens.* |
| Reverse | 0<br>0-1 ⌐<br>0 | 0<br>0<br>0-1-0 ⌐ | Reverse light goes on after one second.*<br>Whistle blows.*<br>Mars light toggles between on and off.* |
| Neutral before forward | 0<br>0-1 ⌐<br>0 | 0<br>0<br>0-1-0 ⌐ | No designated option.<br>Whistle blows.*<br>Reverse automatic coupler opens. |

\* Nothing happens if engine status is slave.
\+ There is no engine sound in any state unless engine was started during reset.

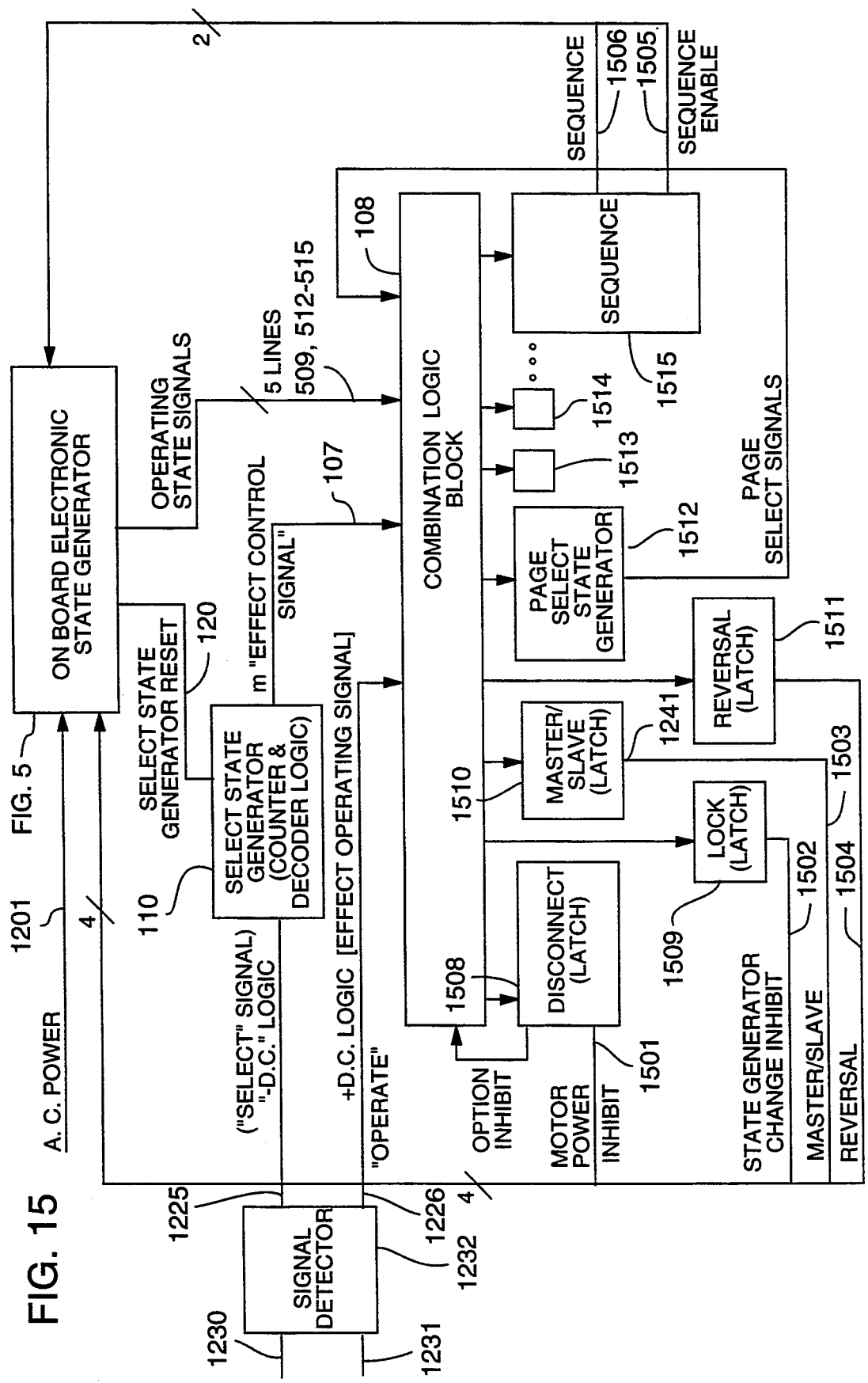

AUTOMATIC INITIALIZATION IN A MODEL RAILROAD MOTOR CONTROL SYSTEM

This is a division of application Ser. No. 07/480,078, filed Feb. 14, 1990, U.S. Pat. No. 5,184,048, which is a division of U.S. Ser. No. 07/37,721, filed Apr. 13, 1987, now U.S. Pat. No. 4,914,431, which is a continuation-in-part of U.S. Ser. No. 06/672,397, filed Nov. 16, 1984, now abandoned.

FIELD OF THE INVENTION

This invention relates to an electronic control system and in particular to the remote control of features and functions on AC powered model railroad locomotives.

BACKGROUND OF THE INVENTION

Ever since the beginning of model railroading the user has desired more and more control over the operation of his model trains. The first electric model railroad locomotives had only a single remote feature—the engine was either on or it was off. Later variable power was added and the operator could then also control the speed of his model trains. This was a definite advantage but still somewhat limiting since the operator could not back the train up. The Lionel company first introduced a slide switch on the engine that could be thrown by hand that would reverse the engine and later introduced an innovative electrical-mechanical on-board (in the engine) motor control unit that would change the engine's direction by simply interrupting the applied AC track power. This unit was later improved by adding a neutral state to allow the train to stand idle when track voltage was applied. This motor control unit had a state sequence that moved from "forward" to "neutral" to "reverse" to "neutral" to "forward" etc. each time the AC power was interrupted. The motor control unit is often referred to as a "reverse unit" or "E unit".

Today most model train engines are equipped with DC motors and the remote control of the trains direction is accomplished by applying either positive or negative DC power to the track. However, when Lionel developed their reverse switch it was difficult to produce DC power and good DC motors were not available. To this day the Lionel company uses AC power with the same basic electrical-mechanical motor control unit design.

The Lionel company also introduced an innovative remote control concept for their on-board whistle. Here a DC voltage of either polarity applied to the track would actuate a DC receiver in the engine that in turn connected track power to the whistle sound device allowing the operator to blow the whistle when the engine was standing idle or moving, all by remote control.

No manufacturer of miniature AC powered trains has ever taken advantage of the fact that both polarities of DC voltage were available. However, model railroad enthusiasts soon discovered that judicious placement of diodes in the engine would allow them to control two trains on the same track independently or to expand their remote control options to two on a single engine.

Model railroaders that used DC track voltage did not have independent remote control options since the two DC polarities were already used to control train direction. Only dependent options were available such as a reverse headlight coming on when the train was moving in reverse.

Another capability that the model railroad enthusiast would like is a way to move engines independently on the same track so that multiple unit consists (more than one engine operating in a single train) could be constructed or taken down in the model railroad yard or a pusher engine brought up to aid a train stranded on a grade. For the operator that uses DC track voltage, it is difficult to couple a moving engine to a stationary engine that occupies the same section of electrified track since both engines would respond to the same applied voltage. For the operator that uses AC track voltage where each engine is equipped with a motor control unit, it is possible to couple a moving engine to a stationary engine since the stationary engine could be in a neutral state. However, once coupled, the two engines would remain out of sync. since each attempt to change the state of one motor control unit would also change the state of the other.

Over the last ten to fifteen years a number of electronic control systems have been developed that attempt to solve one or both of the problems of independent train control and expanded remote control ability. One approach is called command control and uses transmitter/receiver techniques to address single engines at a time. With this technique, each engine is equipped with a receiver that is specifically coded or tuned to receive only one of a number of transmissions that are being sent down the track. In this way each operator equipped with a transmitter can move his engine independently of other operators that have engines on the same section of electrified track. One disadvantage of these control systems has been that only a small number of codes or train addresses are practical for a given system which means that additional engines over this number will be given codes that are already used.

Some of these systems also have remote control options where an operator can turn on a bell or light on his engine independent of other operators. Most of these command control systems have a means of controlling slaving engines together so that multiple unit consists can be made up.

For the operator of AC train equipped with a motor control unit, the solution for multiple unit consists was a little less complicated. In one instance an electronic motor control unit was developed that performed the same function as the original motor control unit but would reset to a specified state if the power was off for more then a specified period (in this case it was about twenty seconds). This way if two or more engines were out of sync. the entire consist could be shut down for eight seconds and once power was restored all engines would be in the same state.

Although this motor control unit solved the problem of multiple unit operation it did nothing for expanding the remote control options.

One application of this invention is to increase the number of remote control options of AC powered electric trains where the locomotives contain on-board reversing units. The motor control units are generally sequenced through their states by interrupting the AC power. The motor control unit used in Lionel trains have four distinct states: 1) forward 2) neutral before reverse 3) reverse and 4) neutral before forward. For remote control, the Lionel company used a DC remote control voltage for their on-board whistle sound effect generator. For this case the polarity did not matter since either a positive or negative DC voltage would turn on the whistle. Although, this is a very limited electric train control system, it has been around for some time and most operators of Lionel trains are very comfortable with it. They tend to resist using complicated digital remote control systems for a variety of reasons. First they are used to using the simple power interrupt to change the direction of their locomotives—there is a quality of delightful simplicity in this. They also do not want to alter their engines to the point where they would not work on other peoples train layout that use original Lionel transformers etc. However, there is some dissatisfaction with the limited number of remote options that are available and some operators have used both positive and negative DC voltages to at least increase the number of remote control features to two.

Adding the additional DC remote control voltage is about as complex a remote signaling system as most Lionel train operators want to go. The challenge for a new AC remote control system is to increase the number of remote options and not change the basic simple and universal operation of the old Lionel control system that has been around for the last fifty years or so.

SUMMARY OF THE INVENTION

In accordance with the present invention a control system has been developed for AC powered trains that uses the state of the motor control unit along with any remote control signals available to the system to actuate a number of remote on-board features. On-board means it is attached to the remote object (a miniature locomotive in this case) that is addressed by the remote control signals.

The object of this invention is to increase the number of remote control functions from that which would normally correspond to the number of control signals available on an electronic control system by using an on-board electronic state generator (104) along with a combination logic block (108) to select groups of operating effects where a particular effect within each group can then be selected and/or operated by the limited number of remote control signals that are available to the system.

In other words, each state of the on-board generator corresponds to a different group of remote control options that can each be selected and/or operated by the remote control signals. If the on-board state generator has "n" stages that select groups of "m" effects each that can in turn be selected and/or operated by the remote control signals, then there are "n×m" (n times m) total remote control options available to be operated by the remote control signals. The on-board state generator has made it possible to increase the number of remote control functions that would be available from the remote control signals alone.

A feature of this invention is to allow the user to choose the remote control features that he would like to use by connecting the desired effect generator (i.e. horn, bell, etc.) into the combination logic block. In other words, if he wants to select remote option "a" or "b" when the on-board state generator is in state "c" he need only connect this option module to desired output from the combination logic block (108) where signal "c" will enable the two effects, "a" and "b" signals to either affect "a" or "b" separately). This gives him a great deal of latitude in choice of options and also allows him to change options at a later time without having to also change the on-board state generator or the combination logic block (108.).

Another feature of this invention is to establish a preferred set of signals between the on-board state generator and the various options modules.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 2A is a truth table relating output logic values Q1,Q2 of the motor control units of FIG. 3 and FIG. 4 as they define four motor control states;

FIG. 2B is a state diagram illustrating transitions among the motor control states of FIG. 2A.

FIG. 7 is a schematic electrical drawing of the DC signal generator used in one embodiment of this invention;

FIG. 8 is a table listing the model train diesel engine remote control options used in one embodiment of this invention;

FIG. 9 is a table listing the model train steam engine remote control options used in another embodiment of this invention;

FIG. 10 is a block diagram showing a horn sound generator;

FIG. 11 is a block diagram showing an electrical latch used to remember the momentary presence of one of the remote control signals.

FIG. 15 is a block diagram of the preferred embodiment.

FIG. 16 is a perspective view of a model train system having a track coupled to an interruptible electric power source for providing a track power signal.

DESCRIPTION OF THE INVENTION

Figure 1:
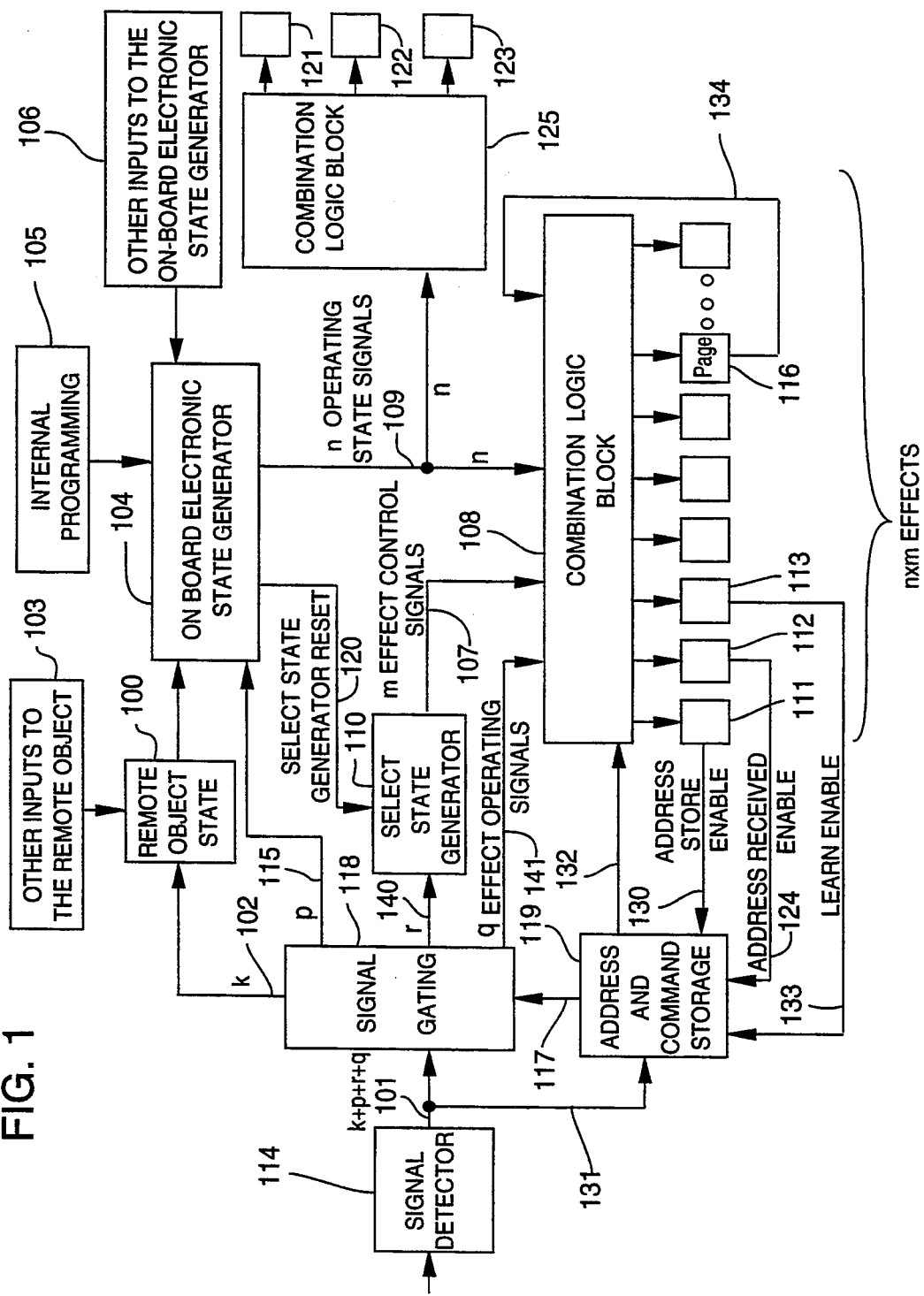
FIG. 1 is a general system block diagram.

FIG. 1 shows the most general case. Here the state of the remote object is indicated by the box 100 labeled "remote object state". The state of a remote object is defined as any aspect of the object that can be distinguished as different. In other words, its temperature, size, mass, velocity, age etc. could be descriptors of its state. Of the "k+p+r+q" total remote control lines 101 available to the system, "k" lines 102 are reserved for changing the state of the remote object. A box 103 labeled "other inputs to the remote object" are included to indicate that the state of the remote object may not be precisely determined by the "k" remote control lines 102. For instance, the temperature of the remote object may be used to change its state. The added on-board electronic state generator 104 is shown receiving inputs from the state of the remote object 100, internal programming 105, "p" lines 115 of the available remote control signals and a box 106 labeled "other inputs to the on-board electronic state generator". In other words, the state of the on-board electronic state generator can be determined from a variety of inputs and only has as a limiting case the same state as the remote object.

The on-board state generator will have only one state at a time. Each state will enable signal gating in the combination logic block, 108, to select and/or operate "m" remote control options for each of the "n" operating state signals 109. This has multiplied the number of remote control options that would be available from the "m" effect control signals, 107, by the total number of states "n" of the on-board electronic state generator. In other words, each time the state of the on-board state generator changes it will enable another set of "m" different remote control effects to be actuated by the same "m" effect control signals.

The state generator could, in principle, have an indefinite number of states limited only by the on-board electronics. In reality, however, it would most likely cycle through a finite number of states to allow the operator to revisit remote control options that have already been addressed.

The "m" effect control signals can either select each of the "m" effects in a group or they can both select and operate each of the "m" effects. If the "m" effect control signals simply select the different effects, then "q" additional signals are provided for operating the selected effects. For this configuration, there are a possible ($n \times m \times q$) different choices since different effect operating signals could have different affects on each of the ($n \times m$) effects.

The box, 110, is used to generate the "m" effect control signals from the "r" detected remote control signals. If there are enough remote control signals available to the system, the "r" lines could be used directly as effect control signals. However, if there are limited remote control signals, 110 can be used to generate additional signals to select the different available "m" effects from the "r" remote control signals. For instance, the select state generator, 110, could simply count the number of times that a particular remote control signal, r1, is applied in a given amount of time and generate one of the effect control signals corresponding to this count. If 110 receives five applications of r1, then the fifth effect control signal is activated. For our train control systems, where there may only be two DC remote control signals available, it's important to increase the number of effect control signals. The signal, 120, from the on-board state generator can be used to alter how the select generator interprets the "r" select signals.

One of the nxm effects, 111, could be used to enable address and command storage, 119, to be activated. This allows unique addresses and commands to be received from some combination of the remote control lines $r+q+k+p$, 131, through combination logic block, 108, and stored in memory located in 119.

For stored commands, the output of 119 through control signals 132, can control how some of the $n \times m$ effects are programmed to respond to the "n" operating state signals and the "q" effect operating signals, and the "m" effect control signals. In this way, the remote object can learn or be programmed by the user in any of a number of ways.

Another of the $n \times m$ effects, 111, can be used to enable 119 to receive and store unique addresses from the incoming remote control lines. Thereafter, effect, 112 is used to enable 119 to receive address information from 131 and compare it to the previously stored addresses. Depending on whether there is a match or not, 119 can, in turn, control how the m effect control signals, and q effect operating signals are interpreted by the combination logic block 108 through signals 132. In addition, 119, can through signal 117 and signal gating block, 118, control the incoming $r+q+p+k$ remote control signals. The idea of programming separate address and commands for each locomotive is new to model railroading.

The box 114 labeled "signal detector" is used to change the incoming remote control signals, $k+p+r+q$ to signals that can be used by the system. For instance, it may detect an incoming fifty kilohertz signal and produce a five volt DC logic signal that can be used by C-MOS AND gates in the combination logic block 108.

The manner in which the on-board state generator 104 changes state can be a function of internal programming 115, or to on-board sensors (i.e. light, temperature etc.) 106 or the state can be sequenced by the "p" 106 remote control signals or it may correspond exactly to the state of the remote object 100 or any combination of the above.

The state of the on-board state generator can be used to activate or control some effect or it may be exclusively reserved to select what options are available to the remaining remote control signals. If the on-board state itself corresponds to a remote effect, that effect will be unavoidably present regardless of which of the other "m" effects are available for that state. There will be "n" of these state dependent effects shown as boxes 121, 122, and 123. Combination logic block, 125, determines which of the "n" possible effects are activated by the "n" operating state signals.

It is assumed here that knowledge of the state of the remote on-board state generator is known at the origin of the remote control signals either through, for example, visual contact with the remote object or because the remote state is known or kept track of by the operator control remote effect. However, it is not implied that the operator necessarily has remote control over the state of the on-board state generator. For instance, the state may be uniquely determined by the temperature in the remove objects environment which may in the case of model train layout be the same at the origin of the remote signals. Here the operator of the remote signals "knows" what the state of the on-board state generator is and "knows" what effects each of the remote control signals will have on the remote object. If the number of states and remote options becomes large, an identical electronic state generator at the transmitter could be used to keep track of the on-board electronic state generator. No physical or electrical connection between the two state generators is implied; only that the inputs to both state generators are designed to be the same.

As an example of how more effects can be generated than the total number of remote control signals, consider the case where an operator has only a total of three remote control signals on an electronic control system: signal #1, signal #2 and signal #3. Assume that there are a total of five unique states of the remote object and that the on-board state generator will correspond exactly to the same five unique states. Each time signal #1 is applied, the remote object and the on-board state generator sequences to the next state (this remote control signal corresponds to the k signals shown in FIG. 1). Assume the operator has done this twice which establishes state #2 in the on-board state generator. In this state there are two remote control functions available (this corresponds to the r or to the m signals in FIG. 1 since there is no select state generator in this example). If signal #2 is applied a red light comes on; if signal #3 is applied a green light comes on. If the operator applied signal #2 and then signal #3 then he would witness the red light coming on and then the green light coming on. If he did neither then the remote function would either be nothing at all or the state-dependent remote function designated for state #2. Assume he now applies signal #1 again and the on-board state generator sequences to state #3. Here again the operator has two choices for the remaining remote control signals plus the remote function designated for the state of the on-board state generator. From this example, it is apparent that there are ten remote control options for signals #1 and #2 (two signals×five states) plus an additional five functions associated with the states of the on-board state generator(state dependent options); a total of fifteen. If the control signals alone had been used, there would only be a total of three.

It is not implied that the control signals are exclusively digital, analog, or that each is limited to only one function. Even without the on-board state generator, each signal could control a vast number of remote options. For instance, each signal might be a digital word encoded on a carrier signal; here the remote features associated with it would only be limited by the length of the word. However, the increase in the remote options available when an on-board state generator is used is still multiplied by the number of states.

Also, the on-board state generator could select a number of remote features that will respond to the control signals in an analog manner. An example would be a remote-control sound feature where the volume would respond to the amplitude or perhaps the frequency of the control signal.

DESCRIPTION OF EMBODIMENTS OF THE INVENTION

Embodiment One

One embodiment of this invention for the control of AC powered model trains uses both positive and negative applied signals superimposed on the AC track voltage as remote control signals. We use short interruptions of AC power to change the state of the on-board motor control unit. We consider the state of the motor control unit to be the state of the remote object (a model locomotive 50 in this case). Our on-board electronic state generator will correspond in part to the state of the motor control unit. However, since the old Lionel motor control units were mechanically operated, it is difficult to translate the state of the motor control unit to an electrical signal that can be used to generate the state of the on-board state generator. Also, the old mechanical design has other problems that are annoying.

FIG. 16 illustrates a simple model railroad layout 10 that includes a track 20. Track 20 is coupled to a power supply 30 over conductors 42. Power supply 30 is connectable via power cord 40 to a source of AC power such as an ordinary household electrical outlet. Power supply 30 preferably includes both a conventional interruptible AC power source for providing a track power signal, and DC signal generator circuitry as further described below with regard to FIG. 7. The model locomotive 50 is positioned on the track.

In order to implement our remote option idea more easily, we have developed a new electronic motor control unit that has become an important part of this design. Our unit will sequence through the same four states that correspond to the mechanical design when AC power is briefly turned off (short power interrupt) but can also be "reset", which will establish the motor control unit in a known state when power has been off for more than three seconds (long power interrupt). We have constructed the unit to allow for easy access of internal electrical states by connecting important signals to two electrical busses on either side of the circuit board. Although there are a total of sixteen signals on the two busses, only four signals are used to define the state of the unit. These are Q1, Q2, Reset and Clk; see FIG. 5. The output logic values that distinguish the states of the unit are shown in FIG. 2A. The corresponding state diagram is shown in FIG. 2B. Q1 and Q2 decode to the four reverse states, Clk is an output pulse that corresponds to the short power interrupt and reset is an output pulse that corresponds to the "reset", or long power interrupt. The reset 201 is shown as the forward (1,1) state, but it may be programmed by the user for any state.

Figure 3:
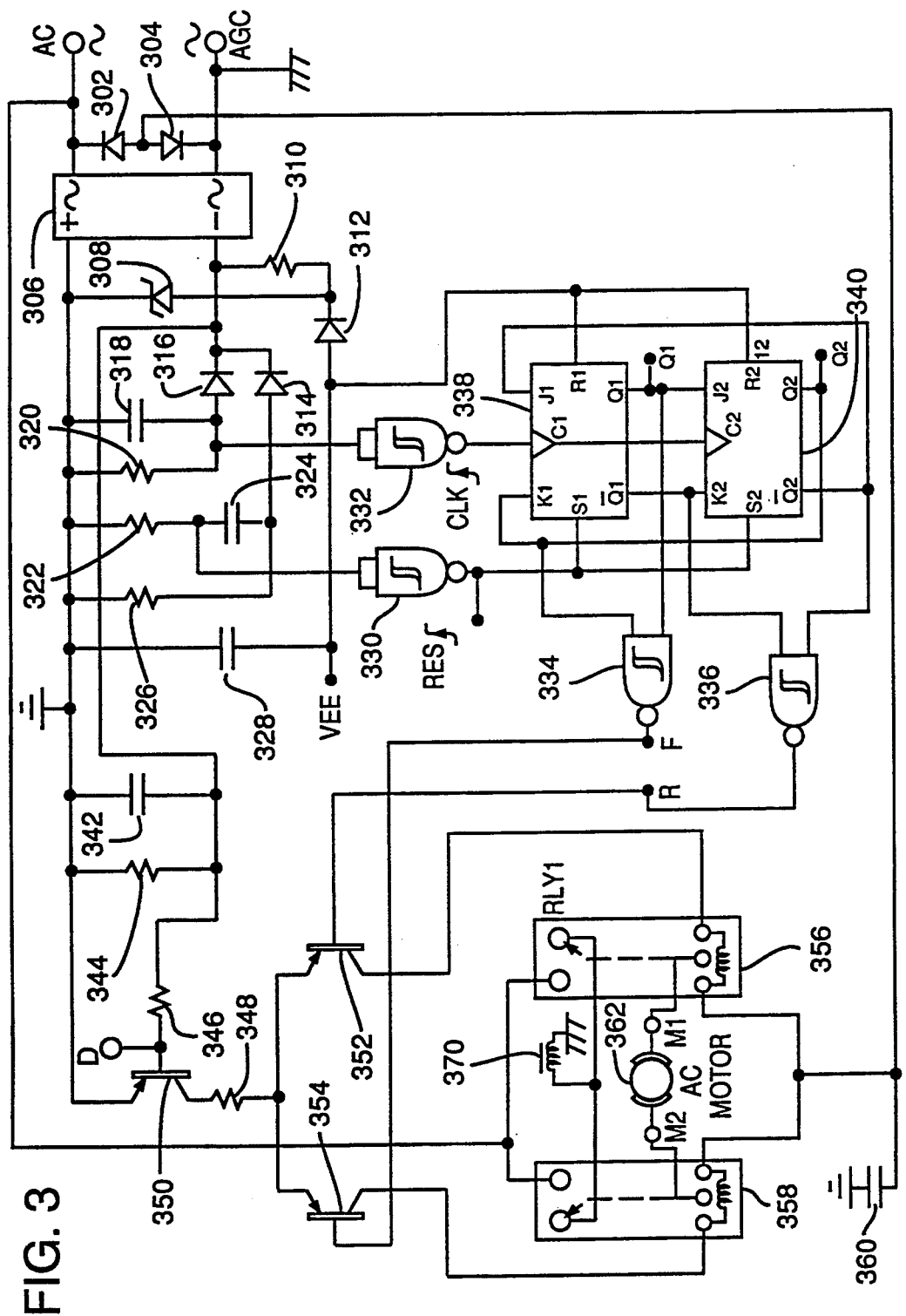
FIG. 3 is a schematic electrical drawing of the electronic motor control unit used for AC motors in one embodiment of the invention.
Figure 4:
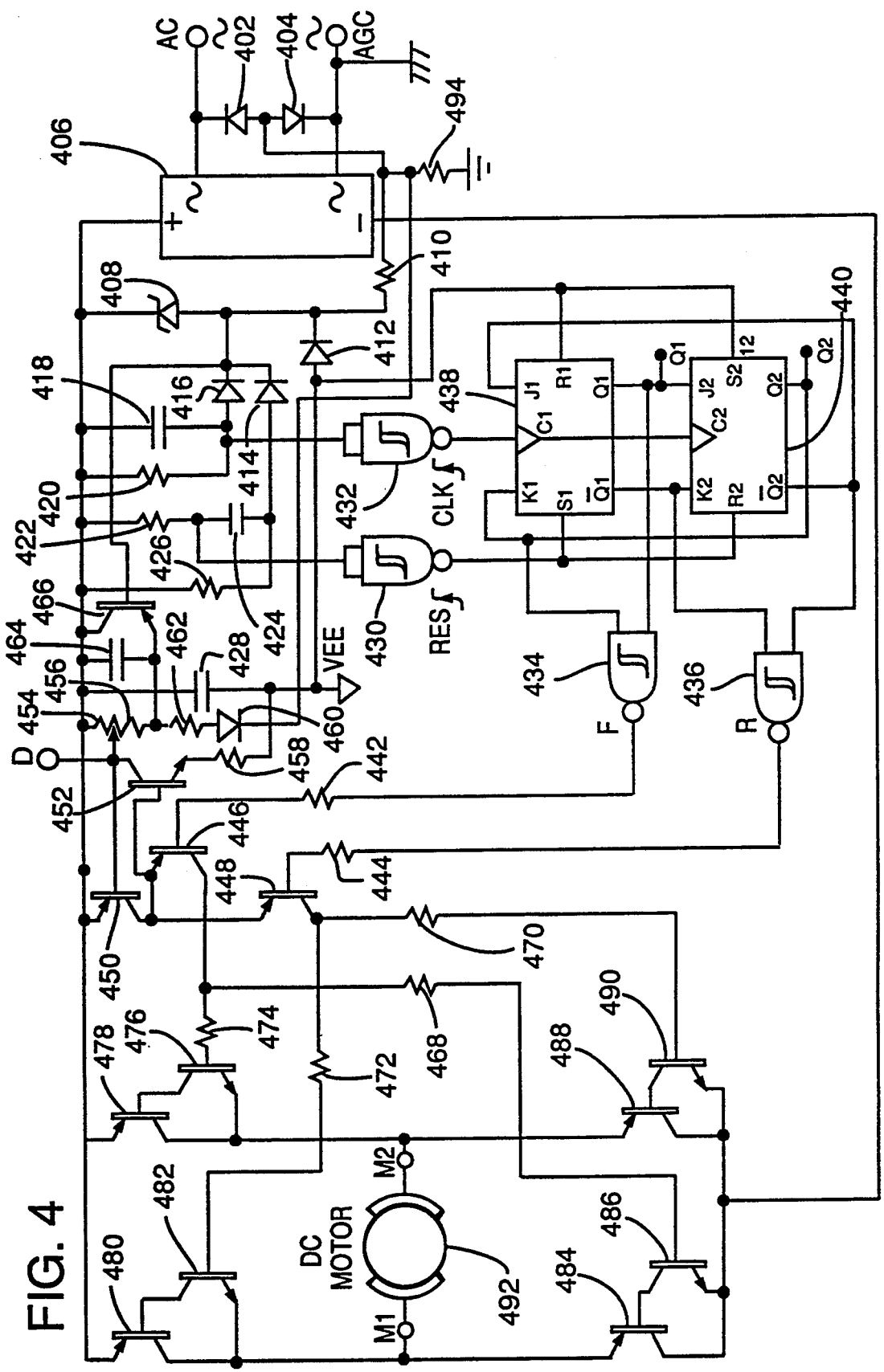
FIG. 4 is a schematic electrical drawing of the electronic motor control unit used for DC motors in one embodiment of the invention.

Actually we have developed two versions; one to control the state of DC or permanent magnet motors and the other to control the state of AC or universal motors. Circuit descriptions for both of these units are given below. Circuit diagrams are shown in FIGS. 3 and 4. Although the two motor control units control different kinds of motors, both have the same states and bus connections to option modules, and both are powered from AC.

Figure 5:
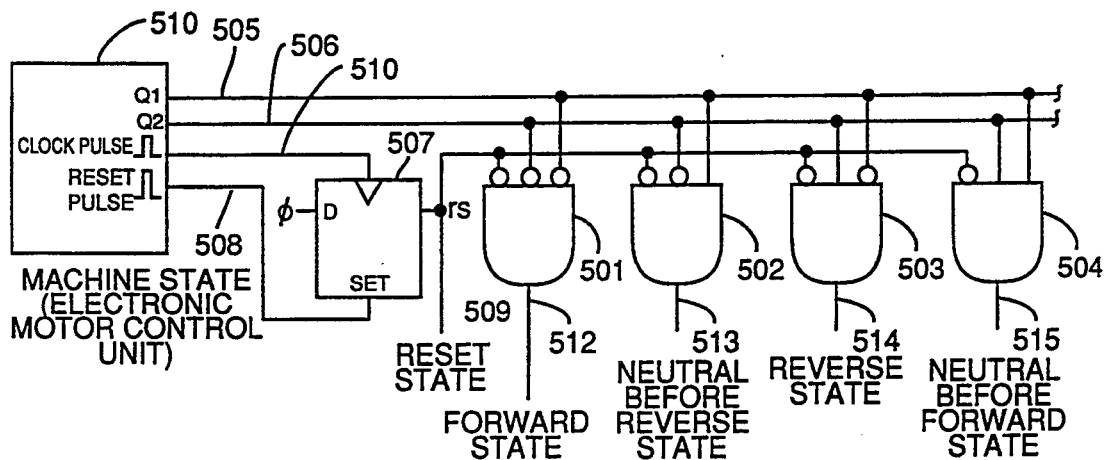
FIG. 5 is block diagram of the on-board state generator and electronic motor control unit used in one embodiment of the invention.

The on-board electronic state generator that we used is shown in FIG. 5. There are a total of five states; including four motor control unit states and an additional reset state. Four AND gates 501, 502, 503, 504 are used to generate the four distinct motor control unit states from the Q1 505 and Q2 506 output signals. In order to establish the reset condition as a unique state, a D flip-flop 507 is used to latch the reset pulse 508. When the motor control unit is turned on after a three second power down, the RS output 509 will be logic "1". When the motor control unit is sequenced to the next state, the clk signal 510 will return the RS output to logic "0" and it will remain at that value through all further short power interruptions. Since the user can program which motor control unit state will correspond to reset (long power interrupt) the "RS" output is shown applied as "not RS" to the four decode AND gates 501, 502, 503, 504. This way, no matter what motor control unit state is selected to come up in reset, there will only be one state corresponding to reset in the on-board electronic state generator.

Since there is a total of five distinct on-board states and two control signals there is a possible ten remote control options. If the state of the on-board state generator is also used for remote control there are an additional five "state dependent" effects possible. In other words, if we use the state of the on-board state generator to actuate a remote feature, that feature will also be present when any of the possible remote functions for that state are actuated by the other two remote control voltages (+DC or −DC).

Figure 6:
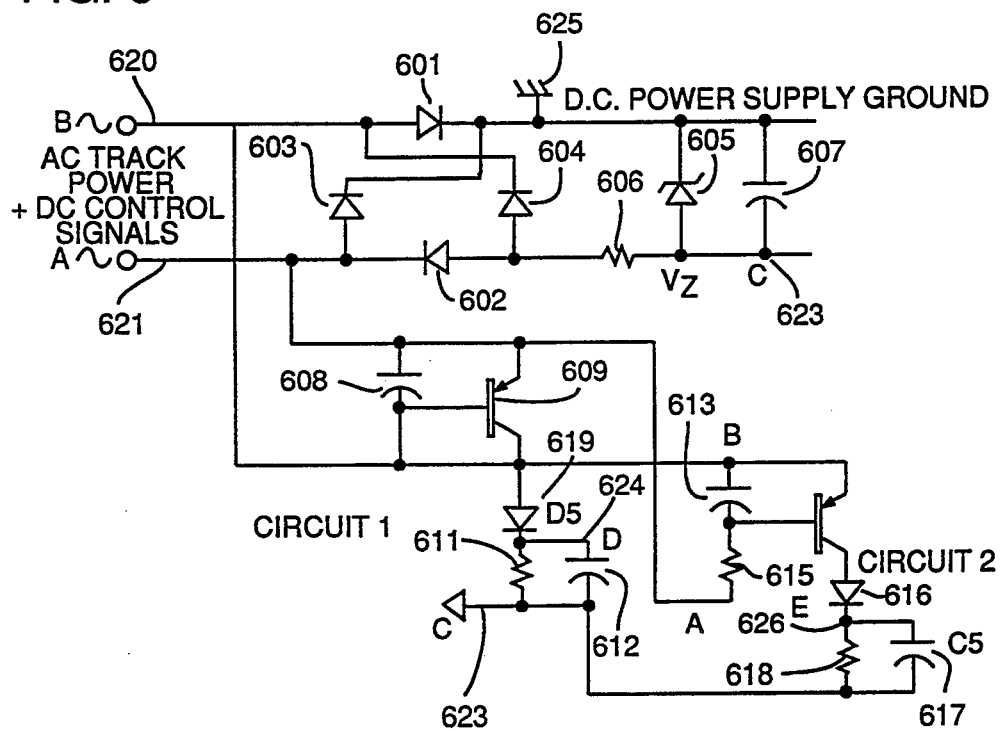
FIG. 6 is a schematic electrical drawing of the DC remote control signal detector used in one embodiment of this invention.

Our signal detector is shown in FIG. 6. It will produce logic signals acceptable to our decode logic that correspond to the positive and negative DC superimposed remote control signals. A circuit description is given below.

A system for transmitting both positive and negative DC control voltages is shown in FIG. 7. Moving the switch arm 701 to "A" 702 or "B" 703 will produce a positive or negative DC voltage respectively superimposed on the AC track power 704.

FIGS. 8 and 9 show two possible embodiments of remote options for this particular system; one for a diesel and one for a steam engine. The first column in each table shows the state of the on-board state generator, and the last column shows the possible remote control effects for each state. The two middle columns show the state of the applied DC remote control signals. A "0" means that no remote signal is applied, a "0-1" indicates that the remote effect is actuated when the signal is applied, a "1-0" means that the remote effect is actuated when the remote signal is turned off, and a "0-1-0" means the remote effect is actuated and remains on even after the remote signal is removed.

An example of the last type of control voltage is for our remote control bell shown in FIG. 11. When a momentary negative DC remote control voltage is applied in the forward state to the clock input 1100 of the D-latch 1102, the output 1101 will toggle between logic "1" or "0" and turn the bell sound effect on or off.

An example of a remote function responding to the continued presence of a remote control signal is our horn sound generator shown in FIG. 11. When a positive DC remote control is signal is applied (0-1) in the forward, reverse or neutral before forward states, the horn sound effect will be actuated as long as the remote control signal is applied.

An example of a remote function responding to removing the remote control signal is the diesel motor start effect. For this option the user applies a positive DC control signal (0-1) in the reset state which starts the sound effect of a large diesel motor turning over trying to start. When he stops the signal (1-0), the motor then starts and continues running. Here two separate effects were generated by a single remote control voltage.

Note that some of the remote control functions depend on whether or not the engine is in slave mode. This is a feature for multiple unit consists. On prototype railroads the first engine is the only one that has a headlight on or the only one that will blow the horn or ring the bell. Other engines (slaves) in the consist are there only to provide power and perform no other functions. For our model diesel locomotives we provide a way of disconnecting some of these remote control options for the slave units so only the first or master unit will respond to the plus and minus DC remote control signals. This can be done with a switch on the engine itself or slave mode can be entered and exited as a remote option.

Figure 12:
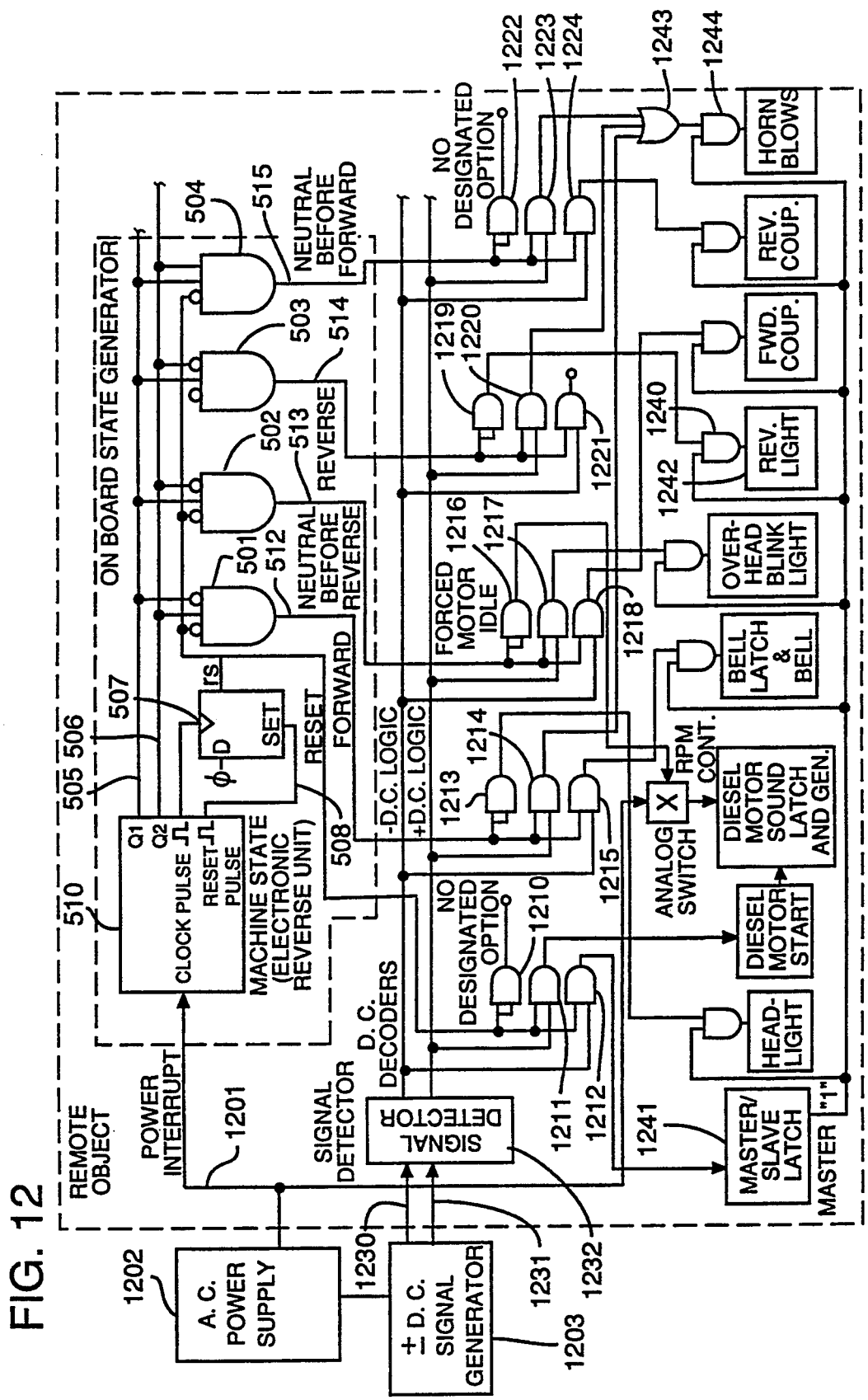
FIG. 12 is a block diagram showing how the diesel engine options listed in FIG. 8 is electrically implemented.

An electrical schematic diagram for the AC train control system for the diesel example above is shown in FIG. 12. The electronic on-board state generator is the-same as FIG. 5 and is redrawn here to show its connections to other parts of the system.

The diesel locomotive (remote object) 1200 is connected to the AC power supply 1202 and the plus and minus signal generator 1203 via the track. The three lines 1201, 1230, 1231 are drawn in to show that there are three kinds on remote control signals available. Short power interrupts 1201 from the AC power supply 1202 sequence the state of the motor control unit 510 directly through the basic four states. Long power interrupts 1201 from the AC power supply 1201 reset the motor control unit into a known state. This plus and minus DC remote control signal generator 1203 is shown connected to the AC power supply 1202 since it applies the DC signals superimposed on the AC track voltage. The DC signals are shown connected to the signal detector 1232 that puts them in a form usable by the system.

The on-board state generator FIG. 5 generates one and only one of five states at a time. The state signals 509, 512-15 are shown connected to signal gating AND gates 1210-1224 along with the plus 1225 and minus 1226 DC logic signals from the signal detector 1232. The output of each AND gate is shown connected to remote functions such as headlights or bells or is shown not connected to anything if there is no remote feature designated for that option.

As an example if the on-board state generator is in "reverse" the output 514 of the AND gate 503 is logic "1". This signal is applied to both inputs of AND gate 1219 which will in turn apply a logic one to the input of AND gate 1240. If the locomotive is in the master mode then the output of master/slave latch 1241 is also logic "1" and the reverse light 1242 will light. This is an example of a state dependent effect.

If a positive DC voltage is applied to the track from the plus and minus DC signal generator 1203, then a logic "1" will also be generated on the +DC logic line 1226 and applied to AND gates 1211,1214,1217,1220,1223. This will produce a logic "1" at the output of AND gate 1220 the only one with two logic "1"s at its input. This signal is applied to OR gate 1243 which produces a logic "1" at the input of the AND gate 1244. If the locomotive is in the master mode the horn will blow.

Circuit Descriptions for the AC and DC Reversing Units (FIG. 3 and FIG. 4, Respectively)

The two reversing units have much circuitry in common. In fact, circuit items 302-340 from FIG. 3 match exactly circuit items 402-440 from FIG. 4. Numbers in parenthesis which follow a FIG. 3 drawing reference number refer to items on FIG. 4. The circuit description will be divided into three sections: Common Circuitry, AC Specific Circuitry, and DC Specific Circuitry.

Common Circuitry

Logic

The flip flops 338(438), 340(440) are wired as a two stage clocked ring counter which can have four possible states, which correspond to the four motor power states. They are (Q1,Q2): (1,1) forward, (0,1) neutral before reverse, (0,0) reverse, and (1,0) neutral before forward. Two of these four states are decoded into signals F (forward), and R (reverse) by 334(434) and 336(436), two of the four NAND gates. These two signals (F,R) are active low. That is when F is low and R is high then the "forward" power state is activated. The other two NAND gates 332(432) and 330(430) are used as a buffer in front of the clock to the flip flops (CLK) and as a buffer which delivers a reset (RES) command to the flip flops, respectively. These Schmitt buffers are needed to insure the flip flops will reliably be put into the expected state, since without them, the CLK and RES signals would have rise times of several milliseconds(ms).

Power Supply

The components which comprise the negative VEE supply are: resistor 310(410) diode 308(408) diode 312(412) capacitor 328(428) and rectifying bridge 306(406). Resistor 310(410) is for current limiting. Zener diode 308(408) works with resistor 310(410) to create a stable voltage at the cathode of diode 312(412). This voltage is passed through Diode 312(412) to charge capacitor 328(428), the power supply filter cap to form the negative power supply (VEE). Diode 308(408) is used to isolate the power supply to prevent capacitor 328(428) from discharging when the input AC is returned to ground. One additional significant discharge path for capacitor 328(428) exists when the AC input is returned to zero when either F or R are low. This is from the current flowing into whichever NAND gate (334 or 336) is in the low state. This is the purpose of disconnect transistor 350(450) to stop this discharge of capacitor 328. The disconnect of all power drains when AC power is interrupted is extremely important as it allows VCC to remain constant independent of state. Without this feature it would be impossible to control the timing accuracy of the reset period much better than 3011 seconds. With this disconnect the reset timing is controlled to 1.5–3 seconds. When AC input power is applied (across AC and ACG) the base of transistor 350(450) is pulled low saturating it. This applies a ground connection to the power control section. When AC is removed, the base of transistor 350(450) (terminal strip connection "D") is pulled to ground by resistor 354(454) thus turning off transistor 350(450) and removing the loads on the NAND gates as well as shutting down the power control section.

Timing Circuitry

The purpose of the timing circuitry is to produce the proper RES and CLK signals in response to interruptions in AC power.

Reset Circuitry

Whenever AC power is interrupted the anode of diode 308(408) rises from its usual −4.3 V to ground. When the AC is applied, the anode of diode 314(414) is at −3.6 V and capacitor 324(424) is charged to −3.6 V as well, the +side of capacitor 324(424) (and the input to the "reset" NAND gate 330(430)) is pulled to ground by resistor 322(422). When AC is interrupted diode 314(414) removes the loading of the input leaving capacitor 324(424) to be discharged by resistor sum 322(422)+324(426). With AC interruptions of less than 3 seconds capacitor 324(424) discharges to less than ½ VEE. Thus, when AC is reapplied, the input to the "reset" NAND 330(430) does not fall low enough to cause a low-to-high transition on the RES line. Therefore, no reset will occur. However, if the AC is interrupted for longer than 3 seconds, capacitor 324(424) discharges to less than ½ VEE and RES will go through a low-high-low transition, resetting the flip flops to their correct state. At power up, after some time (say, 30 seconds), 324(424) will have completely discharged. But, since VEE is still up {328(428) charged to −3.6 V} RES will stay low (−3.6 V) all the while. Thus, at power up, RES goes low-high-low resetting the flip flops. At power up, after a long time (more than 1 hour), VEE will be at ground as well. At power up, both VEE and the input to the "reset" NAND jump to −3.6 V and the RES line jumps high. The flip flop Set and Reset lines are "level sensitive and will asynchronously operate whenever the set(reset) lines are high (0 V). Thus, at initial power up the motor control units will "reset". The "reset" time is determined by time constant 324×(326+322) {or for the DC motor control unit, 424×(426+422)}. This is completely dominated by 326×324 (426×424). Time constant 322×324 (422×424) is selected only to be long enough to ensure that RES stays high(0 V) long enough to effect a proper resetting of the flip flops. It would appear that you could get by with leaving out either 316(416) or 314(414) (but not both). However they were both included to stabilize the reset timing against radically different AC power settings before and after a reset interruption.

Clock Circuitry

Whenever AC power has been on for some time the anode of 308(408) is at −4.3 V and the anode of 316(416) has charged to −3.6 V (a logic low). The output of the "clock" NAND is therefore high. Since flip flops 338(438) and 340(440) are positive-edge triggered, nothing in particular happens yet. When the AC power is interrupted for longer than about ¼ second, the anode of 316(416) changes far enough toward ground to cause the output of the "clock" NAND 332(432) gate to go from high to low. When power is re-applied this NAND gate output goes low to high and clocks the flip flops. If the AC power has been off longer than 3 seconds a "reset" occurs as described above.

AC Specific Circuitry

Input Rectifiers

There are two rectifiers: one is a full wave bridge 306 to power the logic, disconnect circuitry and provide the input signals to the timing circuitry 306; the other is also a full wave bridge made up of diodes 302,304 and two diodes in the bridge 306 to provide the return path to ground. This rectifier charges 360 to provide the negative supply for operating the two relays 356 and 358. The value of this voltage is approximately (−Vpeak+0.7 V). It is significant to note that the use of a full-wave bridge 360 allows proper operation from either AC or DC track power.

Disconnect Circuitry

In the AC unit, the disconnect circuitry consists of 350,346,344, and 342. When AC power is applied a negatively pulsating voltage is applied to the base of transistor 350 through current limiting resistor 346. This saturates 350, applying a ground connection to 348 and thus enabling the motor control section. Capacitor 342 serves to filter the 120 Hz pulsating DC so that the relays don't chatter. Resistor 344 exists to discharge 342 and turn off 350 when AC power is removed.

Relays and Relay Drive Circuitry

With 350 on, DC power will be routed through either 354 or 352 (or neither) depending on the logic state of lines F and R. If F is lo current flows through 354. If R is low current flows through 352. If F and R are both high then neither 354 or 352 conducts. The logic signal voltage on F [R] works with 348 forming a current source which is passed through 354 [352] energizing relay coil 358 [356].

The current source comprises, in the preferred embodiment, a bias source, a DC power supply and a current-source transistor. The current-source transistor, corresponding to transistor 354 (352) in FIG. 3, has a collector (output) coupled to the relay coil 358 (356). The emitter (input) of transistor 354 (352) is coupled through a resistive element 348 and transistor 350 to the DC power supply 306,342,346. The base (control) terminal of transistor 354 (352) is coupled to the bias source, i.e. Schmitt trigger gates 334 (336), respectively. The Schmitt trigger gates, when ON or active-low, sink current (toward VEE), thereby biasing transistor 354 (352) ON, so that the transistor 354 (352) provides a DC current to the relay coil.

More specifically, the track power is provided to diodes 302, 304 and bridge 306, to provide a negative pulsating DC voltage, which is connected to and filtered by capacitor 360. This negative supply voltage is connected to the common node of relay coils 356, 358. It may be noted that the "+" terminal of bridge 306 is connected to ground. Thus, all voltages in FIG. 3 are negative.

One or the other of the coils are energized by a current source as follows. One of the Schmitt trigger outputs R or F is low at a time. For example, F low provides bias voltage to the base transistor 354. The emitter of 354 is connected to resistor 348 which, in turn, is connected through a saturated transistor switch 350 to ground. Transistor 350 remains saturated whenever AC track power is applied. Therefore, the collector of 350 remains at a saturation voltage below ground. The emitter of 354, when F is low, is a $V_{BE}$ above F. Therefore, the voltage across resistor 348 is fixed, so the current through it and into the emitter 354 and out to the relay coil 358 is constant. This circuit thus forms an electronic current source that is independent of load characteristics at the relay coil and the supply voltage at capacitor 360.

The motor field winding 370 is wired to ACG. It is the armature 362 whose current is change by the relays. The field winding and armature winding are connected in series.

DC Specific Circuitry

Input Rectifiers

There are two rectifiers: one is a full wave bridge 406 to power the power transistors and motor; the other is also a full wave bridge made up of diodes 402,404 and two diodes in the bridge 406 to provide the return path to ground. The latter rectifier supplies power for the logic, part of the disconnect circuitry, and provides the input signals to the timing circuitry. Because we use full wave rectifiers this unit can be operated from either DC or AC track power.

Disconnect and Low-Voltage Control Circuitry

The disconnect circuitry consists of 450,456,466, and 456,454,458,462,494,464, and 460. The best way to understand the disconnect circuitry is to first imagine 456,466,454,458,442,494, and 464 are not present in the circuit. Then you would notice that whenever AC power is applied the base of 350 is pulled low through 460 and 462+456 thus saturating 450 and applying power to the power control section. You will also note that whenever the input AC power drops below about 2.1 V peak 450 will turn off. This happens 120 times per second when power is applied independent of the AC amplitude, (so long as the AC power is above 2.1 V peak). At higher voltage settings this effect is not even noticeable. This is all there would be to the disconnect circuitry were it not for one serious problem. The AC power supplies for toy trains often start at six to nine volts and increase to twenty. Most of the DC motors that are easily available start at two to three volts and are at peak power at twelve. In order to have locomotives equipped with DC motors start out at a low velocity when the AC power supply is just turned on, a way must be provided to keep the full power from being applied at lower AC amplitudes. This is the idea behind circuit 454. 454 operates as a voltage divider with 456 keeping 450 off whenever the input AC power is below approximately 1.4 V+(0.7 V)×(RATIO). Where, RATIO=(456+454)/454. The purpose of 494,460,464, and 466 is to provide a timing delay between when power is available to the power control section and when it is actually turned on. The voltage at the emitter of 466 becomes large enough to turn on 450 only after 464 has been charged through 462. Thus, as the ratio of 454/456 is varied, the duty cycle of the applied full-wave rectified power is varied for a given transformer setting. 460 insures that 464 is not discharged as the power waveform passes over its peak. Otherwise, 450 would turn off before the end of the power cycle. When the end of the power cycle is reached, 464 must be rapidly discharged. This is achieved by 466. The instantaneous voltage on the base of 466 can never fall below −4.3 V wince it is clamped by Zener diode 408. As the instantaneous input voltage rises to 0 V diodes 402 and 404 turn off and a path for 466's base current is provided by 494. This turns on 466 which in turn discharges 464. With 464 discharged 450/60 now shuts off. If 464 were not discharged at the end of each half power cycle it would not provide the expected delay in applying the next power half cycle.

A significant advantage of this type of drive is that the DC motor receives "pulse drive" at lower power settings. This is an especially attractive way to start up a DC motor. Its performance is steady and controllable. This performs well, but the drive turning 450 on and off is too gradual and 450 spends far too much time in its active region (remember it is being cycled on and off at a 120 Hz rate). Without 452 and 458, 450 would overheat. 452 is connected to 450 in such a way as to form a "discrete SCR". 458 provides the hold current to keep 452 on once it has been triggered from the AC power input. Also the resistor ratio 454/458 plays an important role in determining the loop gain around 450–452 and thus the exact turn on voltage for 452. The exact expression for turn-on is complicated by the presence of 448 and 446. A smooth pulse driven turn-on beginning at the lowest obtainable transformer voltages (−6 Vpeak) can readily be obtained.

Power Control Circuitry

When logic signal F[R] is low, base current is drawn through resistor 442[444] saturating transistor 446[448] and thus applying a ground connection through resistors 468[470] and 474[472] to the bases of transistors 486[490] and 476[482] respectively. This connection turns on transistors 486[490] and 476[482] which in turn causes heavy conduction of 484[488] and 478[480] respectively. Under this condition, current flows into motor terminal M2[M1], through the motor 492 (or whatever DC load device is desired), and out terminal M1[M2] and is returned to the negative terminal of 406 through 484[488].

By rereading the last paragraph using the terms in brackets one notices that the current that flows through the motor connected across terminals M1–M2 will have its current reversed when logic signal R is low instead of F. If signals F and R are both high then no power is applied to the motor. This is the case for either of the two "neutral" settings. The condition F and R both low would be disastrous. Fortunately, this cannot occur as long as NAND gates 434 or 436 are not defective.

It is interesting to note that the transistor pair 482-480 (or 476-478, 486-484, 490-488) operate as a compound "super" pnp transistor.

Plus and Minus DC Signal Detectors

The DC signal detectors along with our DC power supply for all of our on-board electronics is shown in FIG. 6. AC track power applied between 'B' 620 and 'A' 621 is rectified by the bridge circuit made up by diodes 601-604. A dropping resistor 606 along with a Zener diode 605 produce a negative supply at 'C' 623 equal to Vz. The capacitor 607 is used as a power supply filter.

The RC networks made up of 608 and 610 for circuit 1 and 613 and 615 for circuit 2 are low pass filters that prevent the sixty cycle line voltage at 620 and 621 from turning on either transistor 609 or transistor 614. If a small DC (>0.7 volts) is applied at 620 and 621 in addition to the line current the base emitter junction of either 609 or 614 will be turned on depending on the polarity. If 'A' 621 is DC positive with respect to 'B' 620 then transistor 609 will be on and collector current will flow as long as 'C' 623 is more negative then 'A' 621. This will occur during the entire positive cycle of 'A' 621 when diodes 603 and 604 in the bridge rectifier are forward biased. In addition collector current will flow during part of the negative cycle until 604 is back biased by the a voltage equal to Vz of the power supply Zener 605. As 'A' 621 continues more negative diode 619 prevents the forward biased base-collector junction of transistor 609 from taking current form the Zener supply. Circuit 2 works in the same way if 'B' 620 is DC positive with respect to 'A' 621.

Note that with capacitor 612 placed across 611 the voltage at 'D' 624 will charge to Vsat of transistor 609 below 'B' 620 and diode 619 will conduct only during positive half cycles, assuming the time constant of the low pass filters is much greater then the period of the applied AC power.

Applying a positive DC remote control signal at 'A' with respect to 'B' results in a logic '1' at 'D' 624 (approximately zero volts with respect to power supply ground 625). Applying a negative DC remote control signal at 'A' with respect to 'B' results in a logic '1' at 'E' 626 (approximately zero volts with respect to power supply ground 625). If no DC signal is applied, the voltage at 'D' 624 or 'E' 626 is a logic '0' (−Vz with respect to power supply ground 625).

EMBODIMENT TWO

This embodiment also employs the state of the reverse unit and the five stat electronic state generator described in the first embodiment. However, instead of using "−DC" as a remote control signal, applied AC power supply voltage in excess of a predetermined value is used as an additional remote control signal. This system will be more limited than the first but will be easier for the Lionel user since it will not require him to purchase or construct a −DC generator. The main disadvantage of this approach is that the applied "AC" power supply voltage also controls the speed of the locomotive which makes it difficult to use a particular value of AC power voltage as a remote control signal when the locomotive is in forward or reverse. However, in the three other states of "neutral before forward", "neutral before reverse" and "reset (in neutral)" AC power voltage as a remote control signal is useful.

Figure 13:
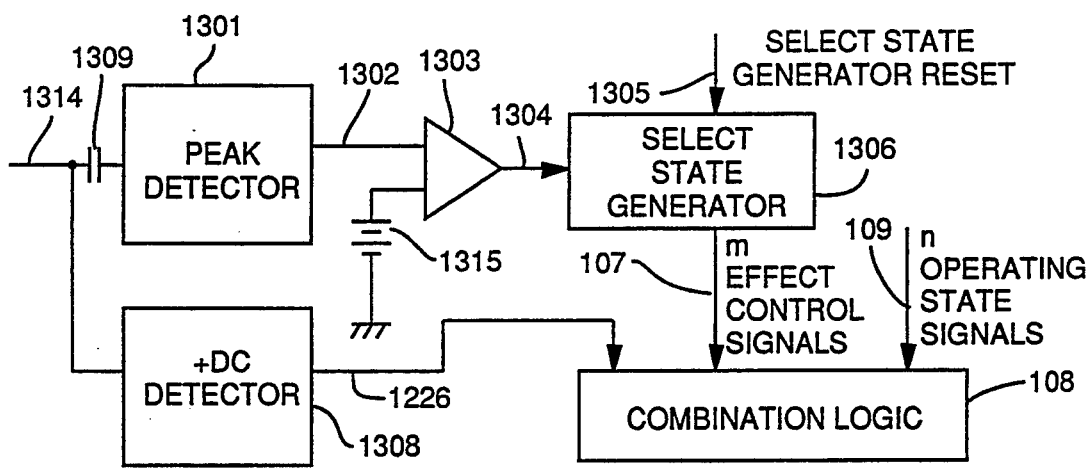
FIG. 13 is a block diagram showing select signal generation using AC power in excess of a predetermined value.

One particular approach is shown in FIG. 13. The peak detector 1301 responds to income AC power by producing a DC voltage, 1302, proportional to the peak AC power supply voltage 1314. The peak detector contains electronic filters to insure that motor or other electrical noise does not get detected and also produces a smooth DC voltage with little AC ripple. Capacitor, 1309, is used to block DC remote control voltages on the track from interfering with the detection of AC power supply voltage. Comparator, 1303, compares peak voltage, 1302, with DC reference source, 1315 and responds with logic signal 1304. The select state generator, responds with one of "m" effect control signals by counting the number of times signal, 1304, is applied. If peak AC power voltage is applied "j" times such that DC signal, 1302, exceeds reference, 1315, each time, then select state generator will respond with the "j"th effect control signal. The electronic state generator is a ring counter and will return to its first state if it is in the "m"th state and one more signal, 1304, is applied. Signal, 1305, from the electronic state generator, will also reset the select state generator, 1306, to its first state when any change in the electronic state generator occurs.

The "+DC" detector, 1308, responds to applied DC voltage that is superimposed on the AC power supply voltage, 1314, in the same manner as detector, 1232, in FIG. 12 except only the "+DC" logic signal, 1226, is generated.

Figure 14:
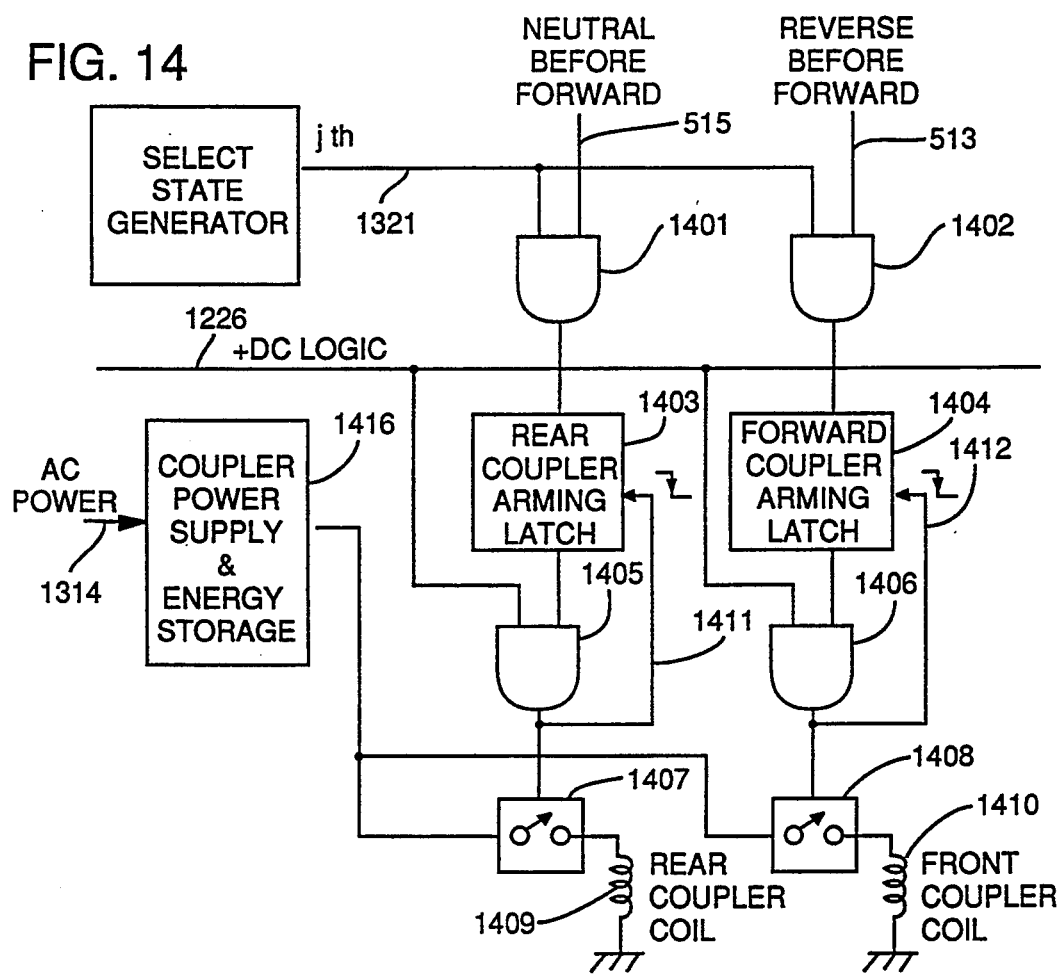
FIG. 14 is a block diagram showing coil uncoupler remote control latch and operation circuitry.

One effect for Lionel model trains that is particularly well suited to this embodiment is shown in FIG. 14. Lionel produced an automatic model train coupler that used a solenoid in the coupler assemble to open the coupler knuckle when power was applied to a special sliding shoe from a special operating track section on the layout. In some engines, Lionel used the DC remote control signal to operate the coupler anywhere on the layout but it eliminated using this DC remote control signal for a remote horn. Also, when the engines had both front and rear couplers, both would open when the DC remote control signal was applied. Since power for the couplers came from the engine, when the engine was moving slowly there was often not enough voltage present on the track to actuate the coupler solenoid.

Our invention eliminates these problems. When the appropriate effect control signal, 1321, is applied the rear coupler arming latch, 1403, or front coupler arming latch, 1404, can be set from AND gates, 1401, or 1402, if the engine is "neutral before forward", 515, or "neutral before reverse", 513, respectively. Once the coupler arming latches are set, they will remain in that state until they receive a reset signal, 1411, or 1412. If a "+DC" logic signal is applied, the selected switch, 1407, or switch, 1408, 1 will close and apply voltage from the coupler supply power supply, 1409, to the connected coupler coil. The coupler arming latch resets 1411 and 1412 are generated from the output of AND gates, 1405, and 1406, respectively.

The coupler power supply, 1416, contains capacitors to store energy from the peak applied AC power supply voltage. This will provide extra power for the couplers when the engine is moving slowly and there is not sufficient voltage on the track. It is convenient that the coupler power supply will charge at the same time that the coupler latches are armed since a high DC voltage is needed to select this effect in the first place.

PREFERRED EMBODIMENT

Referring to FIG. 15, this embodiment also employs the state of the reverse unit and the five state electronic state generator described in the first embodiment, also using "−DC" as a remote control signal.

This system will be similar to the first embodiment but will include several extensions. A block diagram for this embodiment is shown in FIG. 15. This system shows three primary control inputs: 1201, the AC power which goes to FIG. 5, the on-board state generator, 1230 which is the presence of a small +DC signal superimposed on the basic AC power, and 1231 which is the presence of a small −DC signal superimposed on the basic AC power. As discussed earlier, the AC power signal is also used by the remote object itself as a source of energy to operate the motor(s) in the remote object (a toy locomotive.)

The purpose of signal detector 1232 is to extract the information that the +DC (or −DC) signals were superimposed on the AC power and produce a logic control signal at the output which is of a proper format as to be used by the remainder of the system. In this case we envision using CMOS logic. Line 1225 is the −DC logic output control line (called "select" signal) which corresponds to signal 1230 being active. Line 1226 is the +DC logic output control line (called "operate" signal or effect operating signal) which corresponds to signal 1231 being active. In this system, it would not make sense for signals 1230 and 1231 to be active at the same time.

Similar to the previous two embodiments, this system utilizes five control lines 509, 512-515 from the on-board electronic state generator FIG. 5 in combination with m "effect control signals" 107 which are combined at combination logic block 108 with an effect operating signal 1226 to activate a large number of remote-control effects 1505-1514, etc. A new feature here is the presence of 110, the select state generator. This block is a resettable counter plus decode logic which takes the single logic signal ("select") from signal detector 1232 and outputs a number, m (larger than one) of effect control signals 107 by using various aspects of the past history of applied "select" signals 1225 to decide which of the m effect control signals 107 would be active at a time.

This system contains yet one further aspect by which the organization can be improved and the sheer number of possible effects can be extended: this is by using one of the m control positions of 107 irrespective of the condition of the five operating state signals, as what might be called "page advance". This is shown as effect 1512. When 1512 has been enabled via the correct effect control signal 107 and operated via the "operate" signal then the page select state generator will advance to its next state. Page select lines 1507 are fed back to the combination logic block 108 as to direct what would have been the same set of effects, to be chosen from a different set (page). This permits 5× m (five times m) effects for each page (state) of the page select state generator. Rather than simply generating huge numbers of possible controllable effects, this feature provides an excellent way to organize the effects into meaningful groups.

The rest of FIG. 15 consists of several "special" effects which need to be described. By "special", we mean to imply "beyond the obvious set of toy locomotive remote control effects—perhaps, such as "bell", "horn", "uncoupler", "overhead blinking light", etc. These common effects are alluded to be effects blocks 1513, 1514 . . . and so forth. The first of these "special" effects to be described is "sequence", 1515. The "sequence" option is used in the following way: when the "sequence" option has been selected by the proper combination of 107, 509, 512-515, then "sequence enable" signal 1505 is activated. What this does is set up the on-board electronic state generator FIG. 5 to no longer respond to power interruptions on AC power signal 1201 with state changes which would have sequenced the locomotive through its normal direction changes. Instead of responding to 1201, the on-board electronic state generator will respond to changes is the "sequence" signal 1506 coming from the sequence effect 1515. The "sequence" signal 1506 will be activated every time the "operate" signal 1226 is activated—so long as the "sequence" effect is activated (sequence enable, 1505 activated.)

When properly "selected" via control signals 107, 509, 512-515 effect 1511 called "reversal" will reverse the direction that the locomotive considers to be its forward direction every time that the "operate" signal 1226 is activated.

When properly "selected" via control signals 107, 509, 512-515 effect 1510 called "master/slave (latch)" will alternately put the locomotive into a "slave" status or into a "master" status every time that the "operate" signal 1226 is activated. In "master" status the locomotive performs in its normal manner described in this embodiment. However, when the locomotive is in "slave" status, none of the "obvious" effects (such as bells, lights, horns) that the locomotive might display are operable. The locomotive will still respond to direction changes via AC power interrupts, the "sequence" effect, the "reversal" effect, the "latch" effect and the "Disconnect" effect as well as the "master/slave" effect. That is to say, by re-operating the "master/slave" effect the locomotive can be restored to "master" status.

When properly "selected" via control signals 107, 509, 512-515 effect 1509 called "lock" will alternately put the locomotive into a condition where the direction of the locomotive cannot be changed via the usual power interruptions on signal 1201 ("locked" mode) and a condition where the locomotive responds in its usual manner to power interruptions on signal 1201 ("normal" or "unlocked" mode). In the "locked" mode the locomotive will still respond to direction changes via the "sequence" effect 1505 & 1506 if they are properly selected and operated. The important feature here is that whatever direction the locomotive was going (forward, neutral, reverse) prior to the locomotive being put int "lock" mode, it will remain locked into that direction until it is changed via the "sequence" effect or it is taken out of "lock" mode and sequenced in the normal fashion via AC power interruptions on signal 1201.

When properly "selected" via control signals 107, 509, 512-515 effect 1508 called "disconnect" will alternately put the locomotive into a condition where the locomotive behaves as if it were in "slave" with regard to its "obvious" effects and the motor power is forced into an off or "disconnected" status (this is called the "disconnected" mode) and into a condition where the locomotive operates in its usual manner.

We claim our invention to be:

1. A reversing motor control circuit for driving a motor in a remote object on a track, the circuit comprising:
   input means for receiving a track power signal from the track;
   state means for indicating a present state that is one of a predetermined series of states including a forward state, a neutral state and a reverse state, the state means having a clock input for clocking the state means to indicate the next one of the series of states as the present state;
   power control means coupled to the input means for controllably coupling the track power signal to the motor so as to control the motor according to the present state of the state means;
   a reset timing means for resetting the state means to a selected one of the series of states upon completion of a predetermined reset period; and
   a clocking timing means for clocking the state means to the next state upon completion of a predetermined clocking period;
   the reset timing means and the clocking timing means each coupled to the input means to begin the reset period and begin the clocking period responsive to an interruption in the track power signal, whereby operation of the state means is controlled by interrupting the track power signal.

2. A reversing motor control circuit according to claim 1 wherein the reset period is within a range of approximately 1.5 to 11 seconds.

3. A reversing motor control circuit according to claim 1 wherein the reset period is greater than approximately 3 seconds.

4. A reversing motor control circuit according to claim 1 wherein the clocking period is greater than approximately ¼ second.

5. A reversing motor control circuit according to claim 1 wherein the reset timing means and the state means are arranged so as to reset the state means to the neutral state upon completion of the reset period.

6. A reversing motor control circuit according to claim 1 further comprising means for programming the motor control circuit to reset to any desired one of the series of states in response to an interruption in the track power signal having a duration in excess of approximately the reset period.

7. A reversing motor control circuit according to claim 1 wherein the programming means includes means for remotely programming the motor control circuit in response to a remote control signal.

8. A reversing motor control circuit according to claim 1 further comprising means for resetting the motor control circuit to the selected state upon initial power-up of the circuit.

9. A reversing motor control circuit according to claim 1 further comprising means for minimizing loading effects on the reset timing means when the track power signal is interrupted so that the reset period is controllable to a range of approximately 1.5 to 11 seconds.

10. A model train on-board control system comprising:
    an electronic reversing motor control circuit having a predetermined series of states including a forward state, a reverse state, and a neutral state for controllably coupling a track power signal to a motor;
    an on-board electronic state generator having at least one more state than the motor control unit, one of the state generator states being a unique reset state, and the other state generator states including states that correspond to the respective states of the motor control unit; and
    means for resetting the state generator to the reset state responsive to an interruption in the track power signal of at least a predetermined duration, independently of the state of the motor control circuit.

11. A method of initializing a motorized remote object positioned on a track, the method comprising the steps of:
    providing a reversing motor control circuit in the remote object for driving the motor;
    providing an on-board electronic state generator in the remote object for indirectly controlling predetermined effects;
    resetting the motor control circuit to a neutral state so that the remote object remains at rest on the track;
    responsive to the neutral state of the motor control circuit, enabling the state generator to receive remote control signals; and
    transmitting at least one remote control signal to the remote object so as to initialize the state generator while the motor control circuit is in the neutral state.

12. A reversing motor control circuit for use in a model train system having a track coupled to an interruptible electric power source for providing a track power signal, the circuit comprising:
    input means for receiving the track power signal;
    a state machine for indicating a present state that is one of a predetermined sequential series of states including a forward state, a neutral state and a reverse state, the state machine having a clock input for receiving a clocking signal to change the present state to a next one of the series of states;
    clocking means coupled to the input means and to the clock input for providing the clocking signal to change the state machine state to a next one of the series of states in response to an interruption of the track power signal having a duration of at least a predetermined clocking period;
    power control means for controllably coupling the input means to a motor and responsive to the state of the state machine for driving the motor in a forward direction when the present state is the forward state and for driving the motor in a reverse direction when the present state is the reverse state and maintaining the motor in a non-moving state when the present state is in the neutral state; and
    reset means coupled to the input means and to the state machine for resetting the state machine directly to the neutral state responsive to an interruption of the track power signal having a duration of at least a predetermined reset period that is longer than the clocking period.

13. A reversing motor control circuit according to claim 12 wherein the reset period is within a range of approximately 1.5 to 11 seconds.

14. A reversing motor control circuit according to claim 12 wherein the reset period is greater than approximately 3 seconds.

15. A reversing motor control circuit according to claim 12 wherein the clocking period is greater than approximately ¼ second.

16. A reversing motor control circuit according to claim 12 further comprising means for programming the state machine so as to reset to any desired one of the series of states in response to an interruption in the track power signal having a duration in excess of approximately the reset period.

17. A reversing motor control circuit according to claim 16 wherein the programming means includes means for remotely programming the state machine in response to a remote control signal.

18. A reversing motor control circuit according to claim 12 further comprising means for resetting the state machine to the selected state upon initial power-up of the circuit.

19. A reversing motor control circuit according to claim 12 further comprising means for minimizing loading effects on the reset means while the track power signal is interrupted, so that the reset period is controllable to a range of approximately 1.5 to 11 seconds.

20. A model train on-board control system comprising:

an on-board electronic state generator having a predetermined series of states including a forward state, a reverse state, and a neutral state for controllably coupling a track power signal to a motor, and further having an additional, unique reset state; and means for resetting the state generator to the reset state responsive to an interruption in the track power signal having a duration of at least a predetermined reset period.

* * * * *